US005353827A

United States Patent [19]

Bouchard et al.

[11] Patent Number: 5,353,827

[45] Date of Patent: Oct. 11, 1994

[54] PROCESS FOR PRODUCING PASTY PARAFFIN

[75] Inventors: Paul-André Bouchard, Lac Beauport; Réal Lafrance, Repentigny; Pierre Perrault, Terrebonne, all of Canada

[73] Assignee: Chandelles Tradition Candle LTEE, Laval, Canada

[21] Appl. No.: 978,438

[22] Filed: Nov. 18, 1992

[30] Foreign Application Priority Data

Nov. 18, 1991 [CA] Canada ................................ 2055792

[51] Int. Cl.[5] ............................................ G05D 24/02

[52] U.S. Cl. ............................................ 137/1; 137/4; 137/340; 73/54.31; 425/144; 425/803

[58] Field of Search .......................... 137/4, 1, 92, 340; 73/54.28, 54.29, 54.31; 425/144, 803

[56] References Cited

U.S. PATENT DOCUMENTS

| | | | |
|---|---|---|---|
| 1,334,395 | 3/1920 | Patterson | 137/92 |
| 2,274,823 | 3/1942 | Candy, Jr. | |
| 2,626,786 | 1/1953 | McGlothlin | 137/92 |
| 2,885,727 | 5/1959 | Wright | |
| 3,002,221 | 10/1961 | Wright | |
| 3,026,572 | 3/1962 | Reick | |
| 3,702,495 | 11/1972 | Renoe | |
| 3,957,408 | 5/1976 | Clymer et al. | |
| 3,958,909 | 5/1976 | Estrugo | |
| 3,982,720 | 9/1976 | Inderbiethen | |
| 3,998,922 | 12/1976 | Weiss | |
| 4,004,773 | 1/1977 | Binder | |
| 4,022,862 | 5/1977 | McBride et al. | |
| 4,054,636 | 10/1977 | Menig | |
| 4,082,491 | 4/1978 | Clymer et al. | |
| 4,845,635 | 7/1989 | Rosselli | |
| 4,855,098 | 8/1989 | Taylor | |
| 5,209,879 | 5/1993 | Redding | 425/803 X |

*Primary Examiner*—Robert G. Nilson
*Attorney, Agent, or Firm*—Samuel Meerkreebs

[57] ABSTRACT

An apparatus and a method for producing pasty paraffin from liquid paraffin comprises the use of an agitator for mixing the paraffin during its solidification within a receptacle. The viscosity of the paraffin is controlled by the monitoring of the power of a motor driving the agitator. Also, an apparatus is provided for producing candles in bottles from the pasty paraffin produced hereinabove. The apparatus comprises a filling head which receives the pasty paraffin and a continuous wick. A device is included for positioning a ferrule on the wick with the filling head being adapted for lowering into the bottle for positioning the ferrule at the bottom thereof and being also adapted to inject pasty paraffin in the bottle for setting the ferrule. The filling head is then retracted slowly from the bottle while injecting further paraffin therein for filling to a selected level the bottle. While the filling head retracts from the bottle, the continuous wick is made to extend from the bottom of the bottle centrally and longitudinally therein and, once the filling head is fully retracted from the bottle, the continuous wick is cut near or at the top of the bottle, thereby producing a candle in a bottle.

1 Claim, 8 Drawing Sheets

2b
2b
C
100
200
203
205
224
204
222
228
226
206
206
218
220
236
238
234
232
230
202
290
256
216
208
209
207
210

PROCESS FOR PRODUCING PASTY PARAFFIN

BACKGROUND OF THE INVENTION

1. Field of the Invention

The present invention relates to the manufacturing of candles and, more particularly, to an automated process and apparatus for manufacturing candles in containers.

2. Description of the Prior Art

Presently, some candles are manufactured by injecting liquid paraffin into molds, the paraffin being then allowed to cool before the finished candles are removed therefrom. Some candles are produced by compression molding solid granular wax materials although this practice is restricted to molds or containers having vertical walls only.

Other candles are manufactured in containers, such as glass jars, for use principally in sanctuaries. Such candles are produced by filling the jar by hand with the molten candle material (liquid paraffin). More particularly, the operator fills the jars using a hose which is connected to a liquid paraffin supply pipe.

Before filling the jars with liquid paraffin, a wick fixed to a metal wick holder (ferrule) which is produced on a machine intended for this purpose is positioned in the jar. The wick holder is of transverse dimensions equal to the inner transverse dimensions of the bottom of the jar and the wick is fixed to the wick holder at the center thereof. Consequently, the manual positioning of the wick holder inside the jar ensures that the wick extends collinearly to the axis of the jar. Once the jar is filled with liquid paraffin, it is necessary to temporarily provide holders for the wick which are placed on the edges defining the opening of the jar in order to ensure that the wick extends vertically and centrally in the jar until the liquid paraffin solidifies therein. The solidification process of the liquid paraffin can take from eight to ten hours, during which period the jars cannot be handled to prevent the wicks from displacing in the paraffin as it is solidifying.

After this solidification period, the top of the jar has to be levelled with liquid paraffin, since the solidification of the wax brings about a retraction at the center of the jar during primary solidification.

The above represents a manual process which requires a long cooling period for the paraffin and a lot of space to temporarily place the cases of jars for the filling and solidification steps thereof, before which the cases cannot be handled nor shipped nor stored.

The difficulty in centering the wicks in the jars before and during solidification represents a problem which causes an important loss of material. Indeed, after the final filling or topping off of the jars, the wicks which are too long must be cut in each jar.

SUMMARY OF THE INVENTION

It is therefore an aim of the present invention to provide an improved process and apparatus for the manufacture of candles.

It is also an aim of the present invention to provide an automated process and apparatus for the manufacture of candles and especially of the type made in containers such as a glass jars.

It is a further aim of the present invention to provide a process and apparatus for producing pasty candle material.

The present invention enables to solve the problems and disadvantages of the manual operations actually in use in addition to automating the entire operation of filling the jars.

Therefore, in accordance with the present invention, there is provided an apparatus for producing pasty paraffin which comprises a receptacle means adapted to receive liquid paraffin, an agitator means in the receptacle means connected to a motor means. The agitator means is adapted to mix the paraffin during the solidification thereof, a viscosity of the paraffin being controlled by measuring the power of the motor means. Therefore, a pasty paraffin of selected viscosity may be obtained.

Also in accordance with the present invention, there is provided a method for producing pasty paraffin, wherein a liquid paraffin is mixed by an agitator means during the solidification thereof, and wherein a viscosity of the paraffin is controlled by monitoring the power of a motor means driving the agitator means. Therefore, a pasty paraffin of selected viscosity may be obtained.

In another construction in accordance with the present invention comprises an apparatus for producing candles in a container means using pasty paraffin. The apparatus comprises a filling means adapted to receive the pasty paraffin and to receive a continuous wick. A means is provided for positioning a ferrule means on the wick lower than the filling means. A cutting means is also provided. The filling means is adapted to enter the receptacle means with the continuous wick and the ferrule means for positioning the ferrule means at a bottom of the receptacle means. The filling means is also adapted to inject in the receptacle means pasty paraffin for setting the ferrule means at the bottom thereof and is also adapted to retract from the receptacle means with the continuous wick being taut and extending from the bottom of the receptacle means centrally and longitudinally therein. The filling means is also adapted for depositing a selected amount of pasty paraffin in the receptacle means during its retraction. The cutting means is adapted for cutting the wick at or near a top of the receptacle means when the filling means has completely retracted therefrom, thereby producing a candle.

The present new process for the treatment of liquid wax which is transformed into a pasty wax of controlled consistency decreases the cooling or solidification time from eight to one hour, thereby enabling to quickly store the finished product. Consequently, less production space is needed and the capacity of production is substantially increased. Also, the use of pasty paraffin enables the complete operation to be carried out automatically.

Presently, high fusion point paraffin powder (or fully refined paraffin) is compressed in molds to produce candles. The main drawback to fully refined paraffin resides in its cost. On the other hand, if less refined paraffin is used, there is agglomeration and the process becomes inoperative. The process according to the present invention permits the use of scale wax (low fusion point paraffin) which is approximately 50% less expensive than fully refined paraffin. Also, second grade wax tends to be grey and hence unacceptable, whereas with the present process it becomes white and thus usable.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

The present invention pertains to a process for solidifying paraffin into a paste, a filling head capable of introducing a wick and a metal wick holder (ferrule) into a container while filling the latter with the pasty paraffin, and an apparatus for rendering the whole process automatic.

Figure 1:
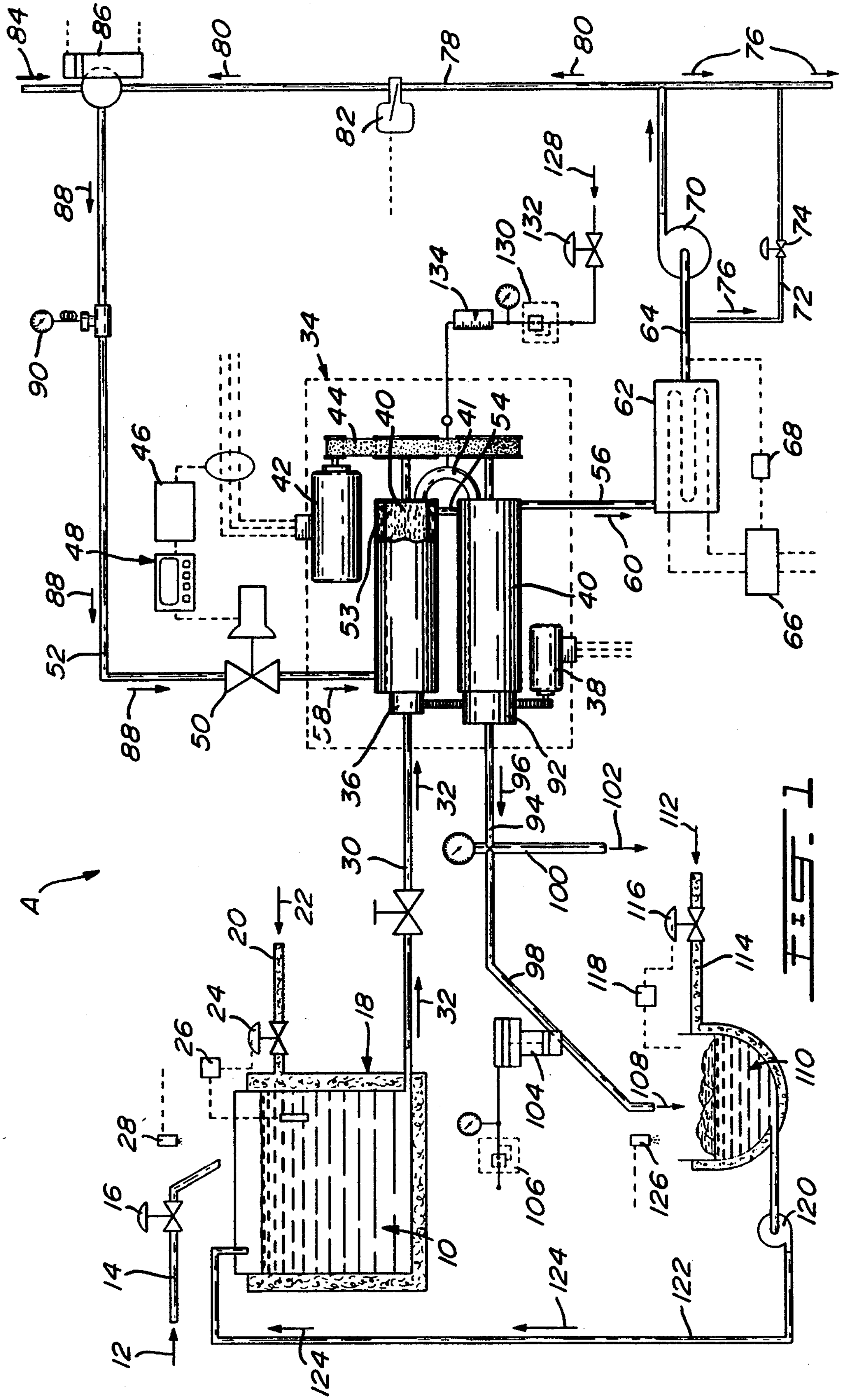
FIG. 1 is a schematic diagram of an apparatus for carrying out a process in accordance with the present invention for producing pasty paraffin.

In accordance with the present invention, FIG. 1 illustrates an apparatus A adapted to carry out a process for producing pasty paraffin as opposed to liquid or molten paraffin. To that effect, it is noted that the control of viscosity of the pasty paraffin and thus the degree of solidification thereof cannot be achieved by detecting the temperature of the paraffin as the solidification process unfolds at a constant temperature.

As long as all of the solidification heat has not been fully extracted, the paraffin remains at the same temperature and the paraffin can theoretically remain at that temperature between 0 and 100% of solidity.

To overcome this problematic characteristic of paraffin, it is herein therefore intended to measure the viscosity of the paraffin by controlling the power of the motor which mixes the paraffin in order to control the temperature of the cooling fluid and thereby obtain a paraffin having a constant degree of solidification.

Now referring to FIG. 1, the apparatus A constitutes a solidification unit which comprises basically four circuits which will be identified and more easily understood after the following general description of the apparatus A.

The apparatus A comprises a feeding reservoir 10 into which is supplied liquid paraffin, for example paraffin #225, by way of a first pipe 12 along arrow 14 with the supply of fresh liquid paraffin therethrough being regulated by valve 16. The fresh liquid paraffin comes from storage reservoirs (not shown) located in the plant. The liquid paraffin is maintained in the feeding reservoir 10, for instance, at a temperature of 145° F. The temperature is maintained constant by a first vapor circuit 18 which heats the feeding reservoir 10 with vapor supplied through a second pipe 20 along arrow 22. A pneumatic valve 24 controlled by a thermostat 26 regulates the flow of vapor to the feeding reservoir 10. Finally, the feeding reservoir 10 is provided with a level detector 28 which controls the opening and the closure of the valve 16 to maintain a constant liquid paraffin level in the feeding reservoir 10.

The liquid paraffin of the feeding reservoir 10 is fed through a third pipe 30 along arrows 32 to a solidification apparatus generally indicated by 34 by a first pump 36 driven by a first motor 38 (1.5 hp). The solidification apparatus 34 is of the type called "votator" which has been modified for liquid paraffin. The solidification apparatus 34 includes two mixing reservoirs 40 which communicate through a U-shaped pipe 41, with both reservoirs 40 being adapted to whip the paraffin by means of an agitator formed of four spiral blades (not shown). Both agitators are driven by a second motor 42 (30 hp) through the use of belts 44. In the mixing reservoirs 40, the paraffin is cooled down by a coolant circuit of controlled temperature which will be described hereinafter.

The coolant supplied by the coolant circuit to the solidification apparatus 34 cools down the paraffin, thereby resulting in the solidification of the paraffin up to a controlled degree to form the required pasty paraffin. The viscosity of the paraffin is measured by controlling the power of the second motor 42 to control the temperature of the coolant and thereby obtain a pasty paraffin having a constant degree of solidification. For this purpose, there is provided a current reader 46 connected to the second motor 42 and to a PID control loop 48 (proportional plus integral plus derivative controlling action) which is programmed to maintain constant the mixing power of the second motor 42 by controlling the cooling and solidification of the paraffin. The PID control loop 48 can be programmed to accommodate various paraffin viscosities.

The PID control loop 48 regulates the solidification of the paraffin in the mixing reservoirs 40 by controlling the operation of a proportional control valve 50 installed on a pipe 52 of the coolant circuit at a location upstream of the mixing reservoirs 40. Annular chambers 53 are provided around each mixing reservoir 40 for receiving the coolant, with the annular chambers 53 of both mixing reservoirs 40 communicating by way of a pipe 54. The coolant thus circulates in these annular chambers 53 before emerging therefrom through a pipe 56 of the coolant circuit. Therefore, when the valve 50 is open, the coolant flows through pipe 50 along arrow 58 into the annular chambers 53 of both mixing reservoirs 40 using pipe 54, and out of the mixing reservoirs through pipe 56 in the direction of arrow 60.

The coolant then flows through a heating element 62 into a pipe 64. There is provided an on/off control 66 of the heating element 62 actuated by a thermostat 68 which senses the coolant temperature in pipe 64. The coolant is then driven by a circulation pump 70 provided with a by-pass 72 and a valve 74 on the bypass 72. Coolant flowing along arrows 76 is directed to a drain.

The remainder of the coolant flows through a pipe 78 along arrows 80, with a coolant flow indicator 82 being provided on pipe 78. Fresh coolant (−50° F.) directed along arrow 84 enters the coolant circuit by way of a 3-way valve 86. Then, the coolant circulates once again through pipe 52 (arrows 88) which is provided with a water flow meter 90.

The pasty paraffin which is at a desired solidification level is extracted from the mixing reservoirs 40 by a second pump 92 which is driven by the first motor 38. The pasty paraffin is thus pumped through a fourth pipe 94 along arrow 96 and then through fifth and sixth pipes 98 and 100, respectively. The pasty paraffin flowing in sixth pipe 100 along arrow 102 is being directed for candle production, whereas the paraffin in fifth pipe 98 represents excess paraffin which is recirculated as described hereinbelow. The fifth pipe 98 is provided with a pressurizing valve 104 and a regulator 106 for controlling the pressure of the paste.

As indicated by arrow 108, the pasty paraffin in fifth pipe 98 ends up in a recovery reservoir 110 which is heated by vapor to return the paraffin to a liquid state. The vapor is supplied along arrow 112 through a seventh pipe 114 provided with a pneumatic valve 116 controlled by a thermostat 118 which reads the temperature of the paraffin in the recovery reservoir 110. The liquid paraffin is recirculated by pump 120 from the recovery reservoir 110 to the feeding reservoir 10 through an eighth pipe 122 as indicated by arrows 124. The recirculation pump 120 is actuated by a level detector 126 provided in the recovery reservoir 110.

If necessary, air supplied along arrow 128 can be introduced into the pasty paraffin of the mixing reservoirs 40 to make it lighter. This is made possible by an air injection regulator 130 which operates a pneumatic valve 132, with an air injection flow meter 134 being also provided.

In the above apparatus A for producing paste, the four circuits found are: the vapor circuit acting on the feeding and recovery reservoirs 10 and 110; the paraffin circuit; the coolant circuit; and the air circuit to make the paste lighter.

We now move on to the description of a candle making apparatus C also in accordance with the present invention, with reference to FIGS. 2 to 15.

Using FIGS. 2 and 2*a* as references, a general description of the main elements forming the candle making apparatus C will now be made, with detailed descriptions thereof following hereinafter.

Figure 2:
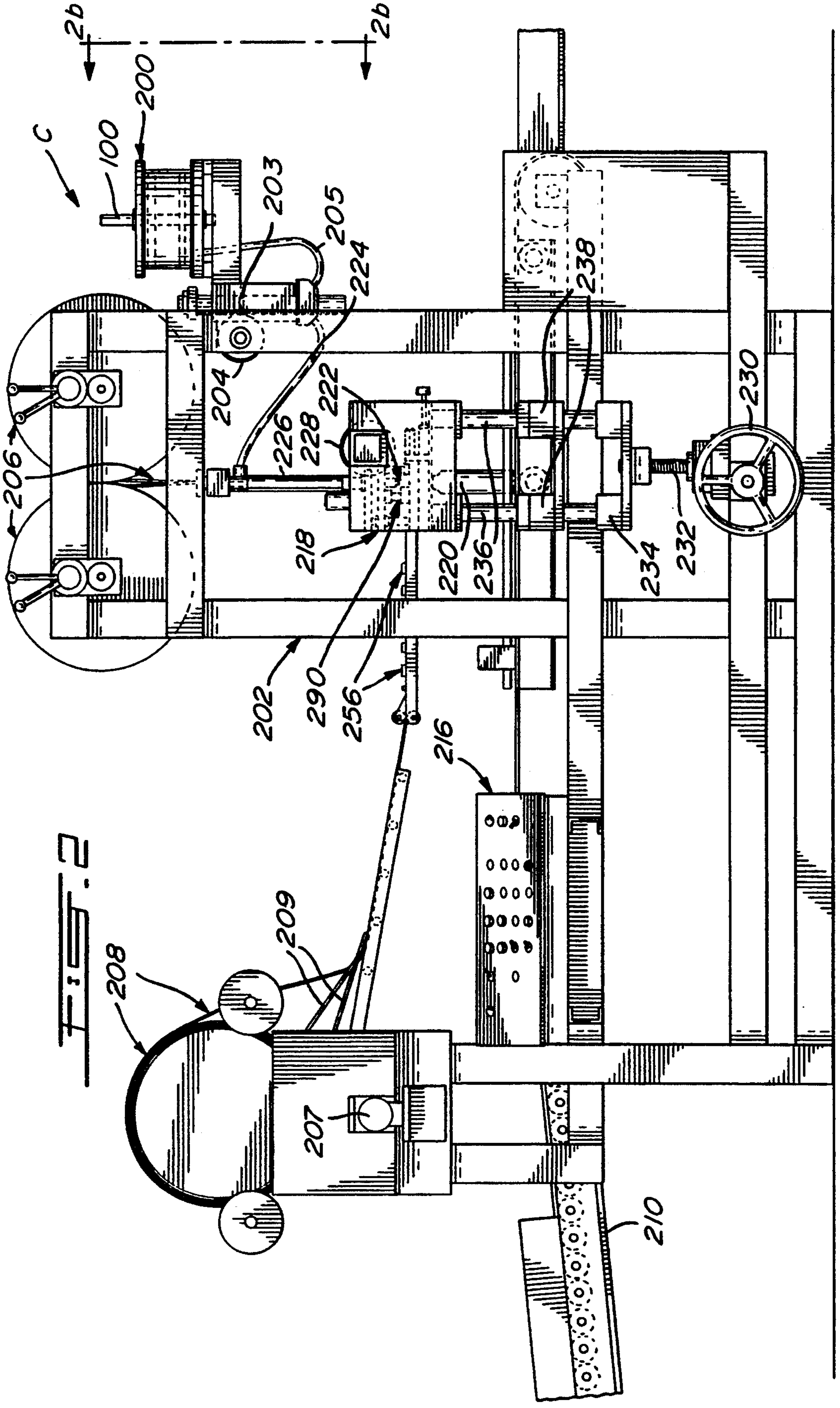
FIGS. 2 and 2*a* are elevation views of an apparatus in accordance with the present invention for making candles in containers using the pasty paraffin produced by the apparatus and process of FIG. 1.
Figure 2A:
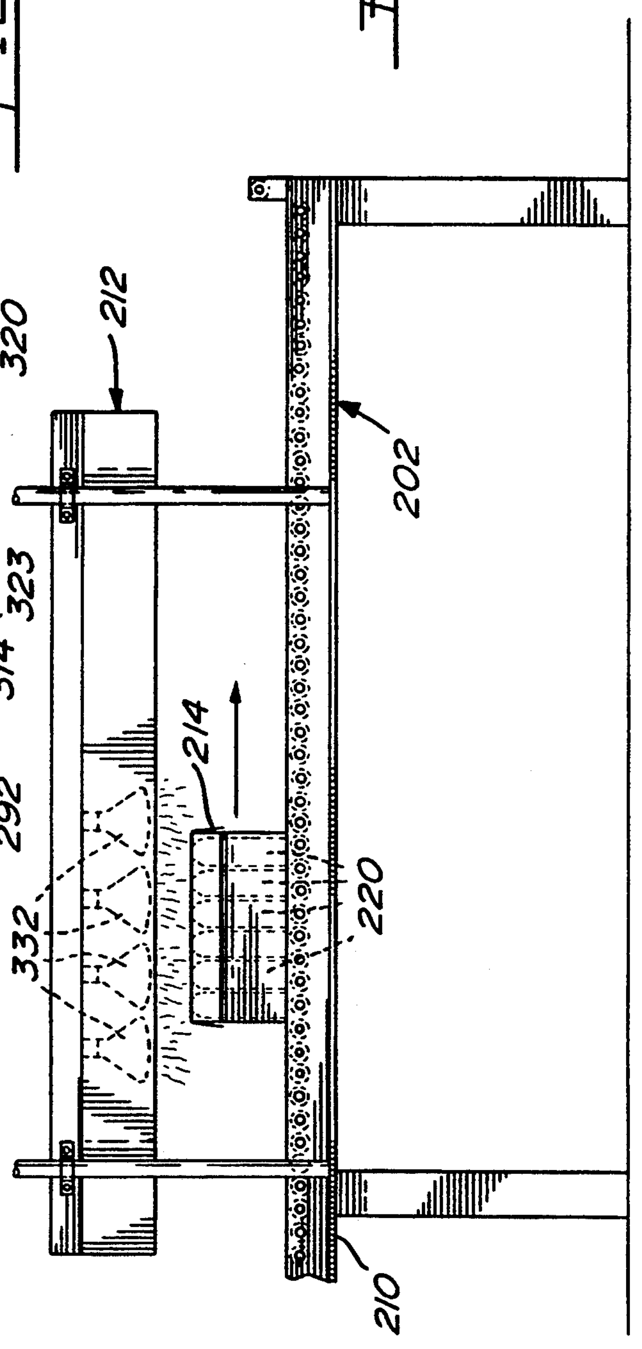
Figure 2B:
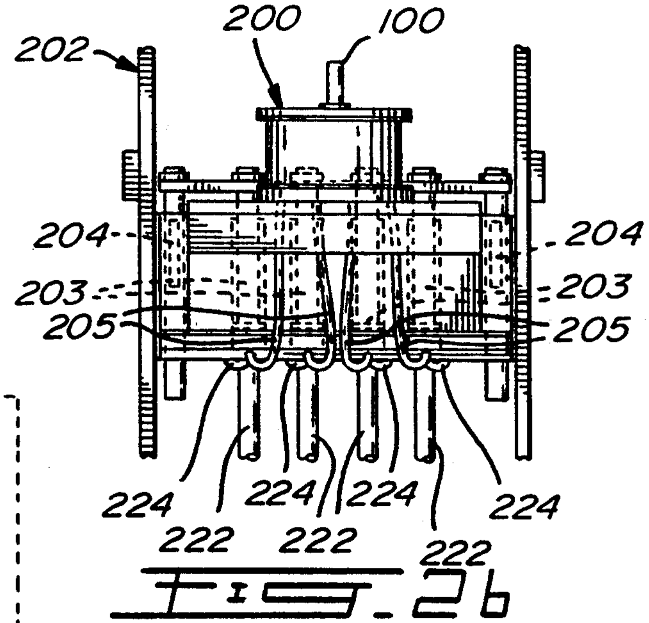
FIG. 2*b* is a side view taken along lines 2*b*—2*b* of FIG. 2.

FIGS. 2 and 2*a* illustrate a production line for filling with the pasty paraffin produced in the apparatus A a plurality of empty containers, such as glass bottles or jars. There is shown the end of the sixth pipe 100 of FIG. 1 through which flows the pasty paraffin necessary in the candle making apparatus C. A supply reservoir 200 for the apparatus C is kept filled with pasty paraffin by the sixth pipe 100. The supply reservoir 200 which is mounted to a frame 202 of the apparatus C is connected by hoses 205 to a series of pumps 203 also mounted to the frame 202 and operated each by a rack and pinion mechanism 204, as best seen in FIG. 2*b*. The pasty paraffin is fed from the pumps 203 to the filling heads 222 through flexible hoses 224 which move up and down with the filling heads 222.

Also mounted to the frame 202 are rolls of continuous lengths of wicks 206; rolls of continuous lengths of ferrules 208 driven by motors 207 and guided during unwinding by ferrule guides 209; and a motorized conveyor 210 for supplying cases of empty bottles (not shown) to the candle making apparatus C and for removing the cases therefrom after the bottles have been filled with pasty paraffin and provided with wicks, at which point the cases are conveyed to a heating apparatus 212 (to make level the top of the pasty paraffin in the bottles), as seen in FIG. 2*a* which also shows such a case of candles in bottles with reference numeral 214.

The apparatus C also includes a control panel 216 for the control and programming of the operations and a device 218 for cutting and stamping ferrules, for joining the ferrules to the continuous lengths of wicks and cutting the latter into individual pieces, for positioning the wick and ferrule assembly in an empty bottle, for filling such bottle with pasty paraffin and for cutting the continuous lengths of wicks. The device 218 which is operated by the control panel 216 is shown in details in other drawings which will be described hereinbelow. For illustration purposes, a single empty bottle 220 is shown in ready position for making a candle therefrom using the device 218. The device includes a filling head 222 which assists in the assembly of the wick to the ferrule and which positions this assembly in the bottle 220, and which is supplied by hoses 224 with pasty paraffin contained in the supply reservoir 200 in order that the filling head 222 may fill the bottle 220. Basically, the filling head 222 is first lowered with the wick and ferrule assembly into the bottle 220 and near the bottom thereof. Then, the bottle 220 is supplied with pasty paraffin as the filling head 222 is gradually raised until the filling of the bottle 220 is completed. The reciprocating up and down movement of the filling head 222 is ensured by the filling head 222 being mounted to a vertical rack 226 which is in meshed engagement with a motor driven pinion 228.

The device 218 can be raised or lowered by rotating a wheel handle 230 in order to accommodate various heights of bottles. Indeed, the wheel handle 230 in conjunction with screw 232 can displace vertically a base 234 and rods 236 extending upwards therefrom, and thus also the device 218 as it is mounted at the upper ends of the rods 236. The movement of the rods 236 is guided by sleeves 238 which are fixedly mounted to the frame 202.

Figure 3:
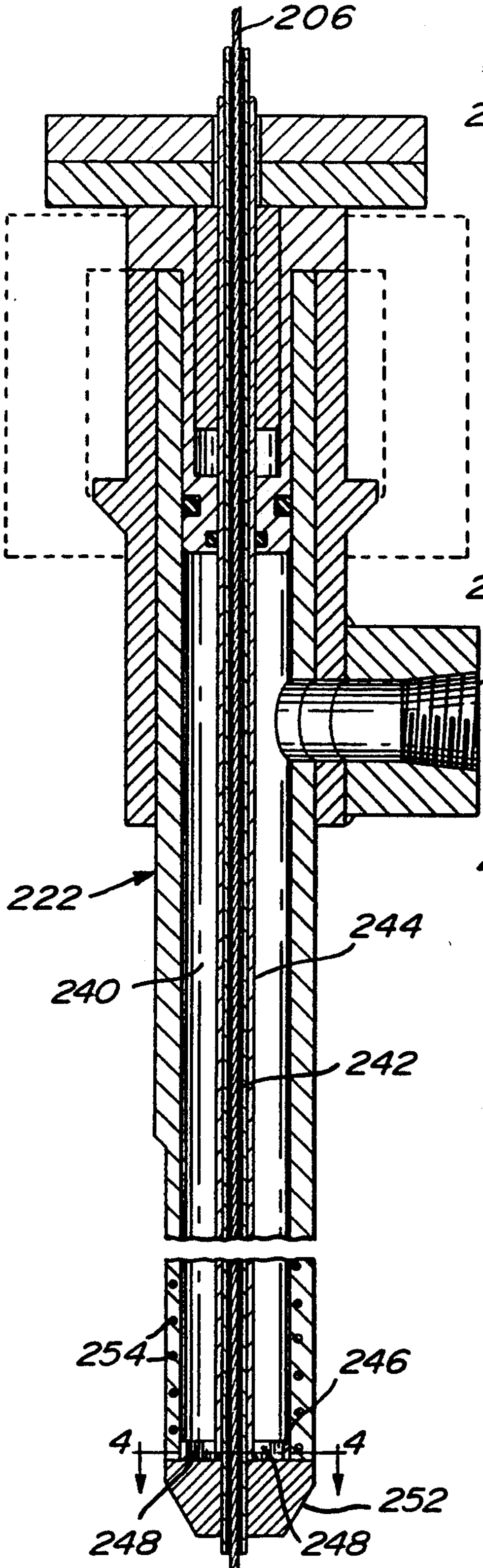
FIG. 3 is a cross-sectional elevation of a container filling head used in the apparatus of FIG. 2.
Figure 5:
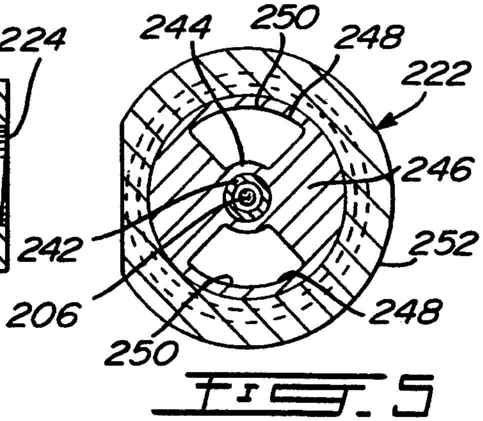
FIG. 5 is a cross-sectional view of the filling head similar to FIG. 4 but showing the valve in an open position thereof.
Figure 4:
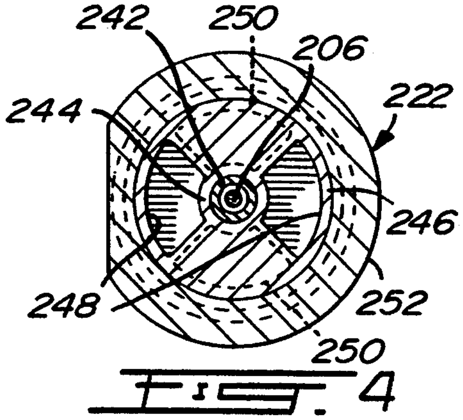
FIG. 4 is a cross-sectional view taken along lines 4—4 of FIG. 3 showing the valve of the filling head in a closed position thereof.

FIGS. 3 to 5 show the filling head 222 in details. The filling head 222 which is small enough to enable it to be inserted in any type of container defines an inner annular cavity 240 into which the hose 224 supplies the pasty paraffin. A wick guide and holder 242 in the form of a vertical elongated tubular member extends longitudinally through the filling head 222 and slidably receives therein the wick 206. For reasons which will obvious hereinafter, the wick holder 242 can be longitudinally displaced with respect to the rest of the filling head 222. A sleeve 244 is slidably positioned over the wick holder 242. A motor connection (not shown) at its upper end allows for the sleeve 244 to be rotated about its axis in increments of 90°. A horizontal flat disk-shaped valve 246 is fixedly mounted at the lower end of the sleeve 244 so as to rotate therewith. The valve 246 defines a pair of opposite horizontal openings 248, as seen in FIGS. 4 and 5. A similar pair of openings 250 are defined under the valve 246 in a lower end 252 of the filling head 222. Therefore, depending on the relative positioning of the valve 246 with respect to the lower end 252 of the filling head 222 and thus to the openings 250, the openings 248 of the valve 246 can coincide with the openings 250 of the filling head 222 (see FIG. 5), or the openings 248 and 250 can be out of phase by 90° (see FIG. 4). In the open position of the valve 246 (FIG. 5), pasty paraffin will flow out of the filling head 222 and into the bottle 220, whereas in the closed position of the valve 246 (FIG. 4), the pasty paraffin is trapped in the filling head 222. The filling head 222 includes an electrical heating element 254 around a lower portion of the cavity 240 thereof to prevent the pasty paraffin from solidifying in the filling head 222 when the flow of paraffin is interrupted, that is when the valve 246 is closed. The filling head 222 is also self-cleaning with vapor.

To produce a candle in a bottle using the present invention, a notch must be stamped out of the ferrule, the wick must be jammed in the notch of the ferrule, and then the ferrule must be cut from its continuous length to form a small piece which can be inserted in the bottle. After that operation, the filling head carries the wick and ferrule assembly in view of the fact that the wick extends therethrough and that the ferrule is stuck to the wick. Therefore, the filling head can now be lowered in the bottle to fill the same with pasty paraffin. Then, the filling head retracts from the bottle, at which point the wick is cut before the cycle can be repeated.

Figure 6:
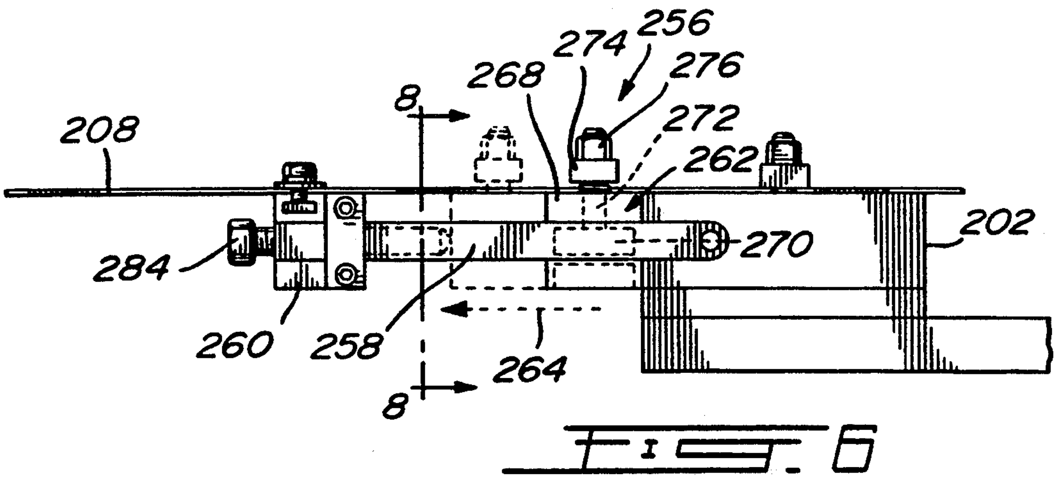
FIGS. 6 and 7 are elevation views of a detail of the apparatus of FIG. 2 illustrating in two different positions a ferrule driving device.
Figure 7:
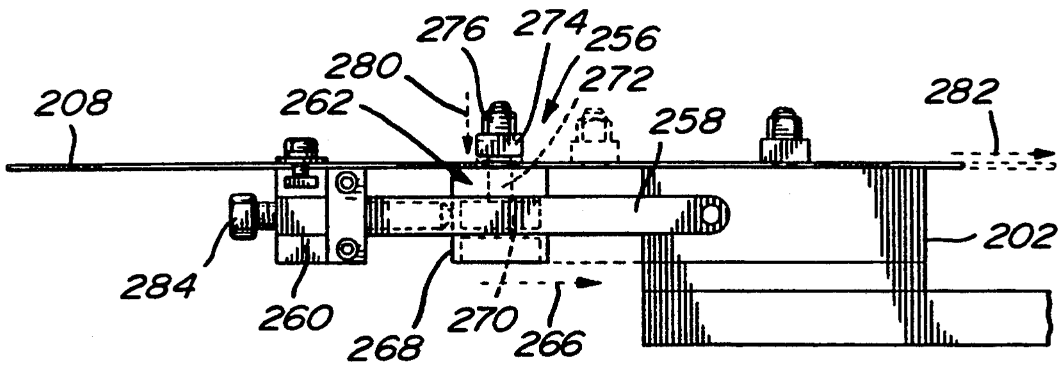
Figure 8:
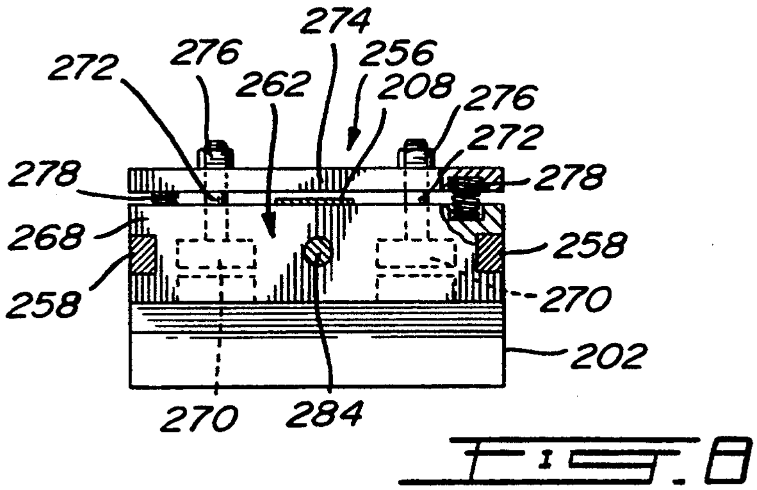
FIG. 8 is a cross-sectional view taken along lines 8—8 of FIG. 6 of the ferrule driving device.

In FIGS. 6 to 8, there is shown a ferrule driving device 256 mounted to the frame 202 for intermittently forwarding the ferrule 208 and thereby drive the free end thereof into engagement with the wick 206, with this assembly of the ferrule 208 with the wick 206 taking place before they are separated from their respective rolls, as it will further be described.

For achieving the above, the ferrule driving device 256 comprises a pair of parallel elongated guide members 258 extending horizontally from the frame 202 and provided with a stop block 260 at their cantilevered ends opposite the frame 202. A drive member 262 is slidably engaged at its two longitudinal sides on the guide members 258 and is adapted for reciprocal longitudinal movement between the frame 202 and the stop member 260 (see arrows 264 and 266 of FIGS. 6 and 7) by means, for instance, of a horizontal piston and cylinder arrangement (not shown).

The drive member 262 includes a base 268 which houses a pair of electromagnets 270 with a guide rod 272 extending upwards from each electromagnet 270. A plate 274 is mounted to the upper ends of the guide rods 272, with springs 278 being provided between the base 268 and the plate 274 for urging the plate 278 away from the base 268, as best seen in FIG. 8. Nuts 276 are fixed at the threaded ends of the guide rods 272 to limit the upwards displacement of the plate 274. The ferrule 208 extends through the driving device 256 between the base 268 and the plate 274 thereof. Energizing the electromagnets 270 forces the plate 274 towards the base 268 along the guide rods 272, thereby securing the ferrule 208 to the drive member 262.

The ferrule driving device 256 operates as follows. When the ferrule 208 is ready to be displaced forwards into engagement with the wick 206, the electromagnets 270 are energized which causes the plate 274 to lower as indicated by arrow 280 in FIG. 7. The ferrule 208 being locked to the drive member 262, the piston is actuated to displace the drive member 262 along the arrow 266 right to the frame 202 and thus the ferrule 208 along arrow 282 into assembly with the wick 206. Once the ferrule 208 and the wick 206 are engaged, current is cut from the electromagnets 270, thereby releasing the plate 274 from against the ferrule 208, at which point the drive member 262 is displaced by the piston along arrow 264 of FIG. 6 until it abuts the stop block 260. The stop block 260 is herein provided with a stop bolt 284 to limit the movement of the drive member 262, with the stop bolt 284 being adapted to be longitudinally adjusted to vary the displacement of the drive member 262 and thus of the ferrule 208. This allows the ferrule to be cut (see FIG. 9) in various lengths to accommodate various sizes of bottles 220.

Figure 9:
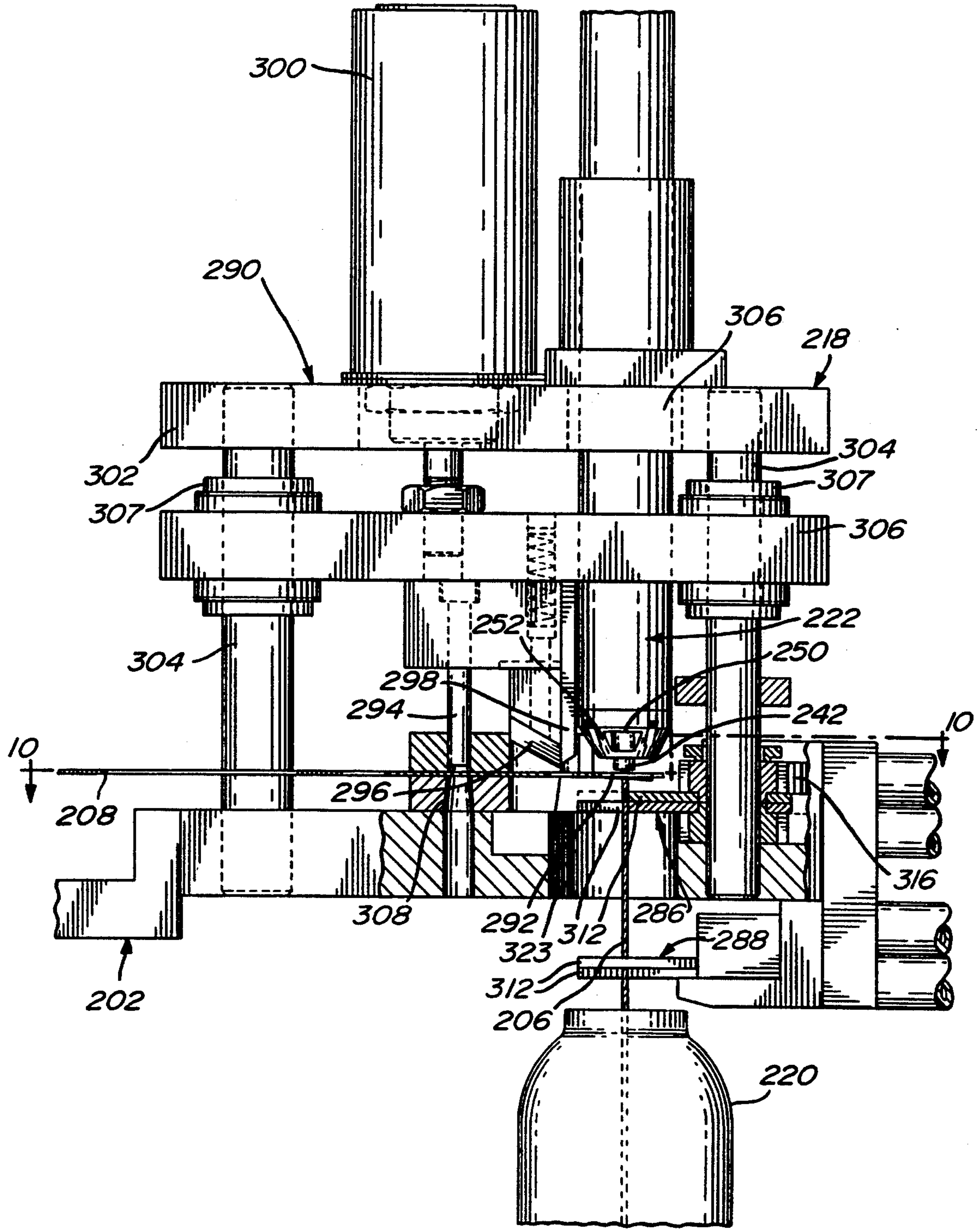
FIG. 9 is an elevation of a detail of the apparatus of FIG. 2 showing the ferrule stamping and cutting device and the mechanism for assembling the wick to the ferrule.

FIG. 9 illustrates the filling head 222 in its uppermost position following the filling of the bottle 220 and prior to the wick 206 being cut by cutters 286 and 288. At that point, the wick 206 is tight as it is set at its lower end in the pasty paraffin contained in the bottle 220 while extending through the wick holder 242 of the filling head 222 directly to its inert roll which is shown in FIG. 2. Therefore, a free end 292 of the ferrule 208 which defines a longitudinal notch (by way of a ferrule stamping device which will be described hereinafter) can be driven forwards by the ferrule driving device 256 of FIGS. 6 to 8 into engagement with the tight wick 206 at the apex of the notch. In FIG. 9, the stamped ferrule free end 292 is shown assembled to the wick 206. Then the wick 206 is ready to be sectioned by the cutters 286 and 288 at two spaced apart locations, one location being just under the stamped ferrule free end 292 and the other being just above the bottle 220 (see also FIG. 10).

Once the wick 206 has been cut, the filling head 222 can be plunged towards a new empty bottle 220, with the stamped ferrule free end 292 being pushed downwards by the wick holder 242 thereby carrying the wick 206 which unwinds from its roll. The filling process of the bottle 220 which then follows will be described hereinbelow.

As the wick 206 is being cut by the cutters 286 and 288 and just prior to the lowering of the assembly of the wick 206 and stamped ferrule free end 292, it is necessary to separate the ferrule free end 292 from the continuous length of ferrule 208 located rearwards thereof. Also, it is necessary to stamp the notch and the circular hole in the ferrule 208 before the ferrule is driven in another cycle by the driving device 256 towards a new length of wick 206. These operations are accomplished simultaneously by a ferrule stamping device 290 which is seen in FIG. 9.

The stamping device 290 includes first and second punches 294 and 296 respectively and a cutting blade 298 which are all actuated simultaneously by a solenoid 300 to displace directly downwards towards the ferrule 208, as seen in FIG. 9. The solenoid 300 is mounted on a base 302 which, in turn, is mounted at the upper ends of guide rods 304. The punches 294 and 296 and the blade 298 are carried by a member 306 provided with sleeves 307 which are slidable on the guide rods 304, with the solenoid 300 acting directly on the member 306 to operate the punches 294 and 296 and the blade 298.

Figure 10:
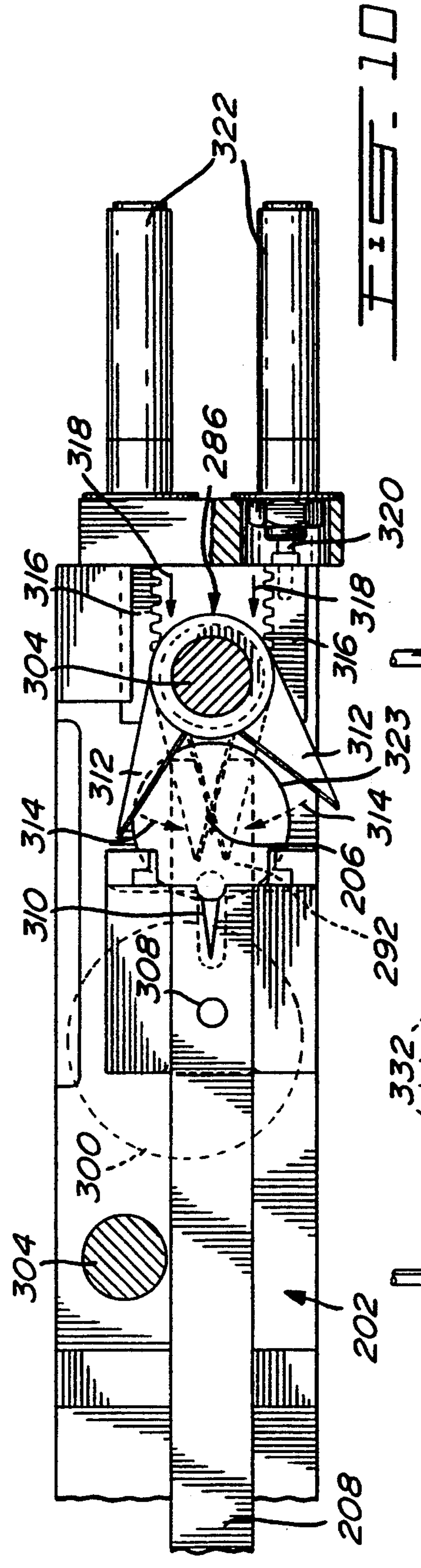
FIG. 10 is a cross-sectional view taken along lines 10—10 of FIG. 9.

As best seen in FIG. 10, the first punch 294 is of circular cross-section for forming a circular hole 308 in the center of the ferrule 208, whereas the second punch 296 is adapted to define a V-shaped notch 310 longitudinally on the ferrule 208, with the notch 310 extending rearwards from its larger portion to its apex and with this larger portion being defined about the circular hole 308 in order that the circular hole 308 facilitates the piercing action of the second punch 296 that forms the notch 310.

The cutting blade 298 has the purpose of separating the stamped ferrule free end 292 from the continuous length of the ferrule 208.

As indicated hereinbefore, the cutting of the wick 206 is effected by the cutters 286 and 288 which are of identical construction and which are actuated simultaneously after the assembly of the stamped ferrule 292 to the wick 206 and before the filling head 222 is lowered towards the bottle 220. Now principally referring to FIG. 10 which best illustrates the structure of the cutters with a detailed view of the cutter 286, it is easily understood that the cutter 286 includes a pair of cutting arms 312 which are adapted to pivot along the directions of arrows 314 upon the longitudinal displacement of a pair of racks 316 along arrows 318 in order to cut the wick 206. Each rack 316 is operated by the actuation of a piston 320 from a cylinder 322. The cutting arms 312 are returned to their positions shown in FIG. 10 by the retraction of the piston 320 into the cylinder 322.

Figure 11:
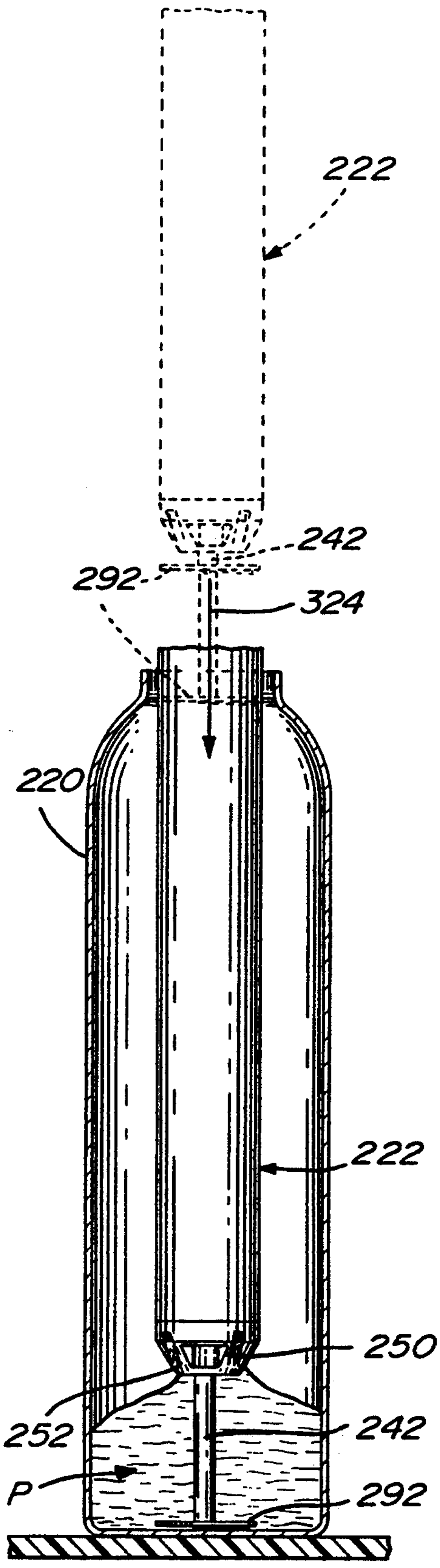
FIGS. 11 and 12 are cross-sectional views of the filling head of FIGS. 2 and 9 showing various stages of the filling of a container with the pasty paraffin.

Once the stamped ferrule 292 has been assembled to the wick 206 and separated from the continuous length of ferrule 208 and that the wick has been sectioned by the cutters 286 and 288, the filling head 222 is ready to be lowered through an opening 323 defined in the frame 202 along arrow 324 towards the empty bottle 220 while carrying the wick and ferrule assembly for reasons previously described and as seen in phantom lines in FIG. 11. At that point and time, the valve 246 of the filling head 222 is closed to prevent pasty paraffin from flowing therefrom. Before the filling head 222 is entered in the bottle 220, the wick holder 242 is longitudinally moved downwards relative to the filling head 222 in order to increase the distance between the stamped ferrule 292 and the valve 246, as also seen in phantom lines in FIG. 11.

Then, the filling head 222 is plunged into the bottle 220 until the stamped ferrule 292 abuts the bottom of the bottle 220 as seen in full lines in FIG. 11. The filling head 222 automatically centers the stamped ferrule 292 and thus the wick 206 in the bottle 220. The valve 246 of the filling head 222 is then opened in order that pasty paraffin P supplied by the reservoir 200 of FIG. 2 into the cavity 240 of the filling head 222 seen in FIG. 3 is introduced at the bottom of the bottle 220 while burying therein the stamped ferrule 292. Pasty paraffin P deposited at the bottom of the bottle 220 such as to cover the stamped ferrule 292, such as seen in FIG. 11, will at least partly solidify therein, whereby the stamped ferrule 292 remains set in the bottle 220 when the filling head 222 is raised to continue the filling of the bottle 220 with pasty paraffin P.

Figure 12:
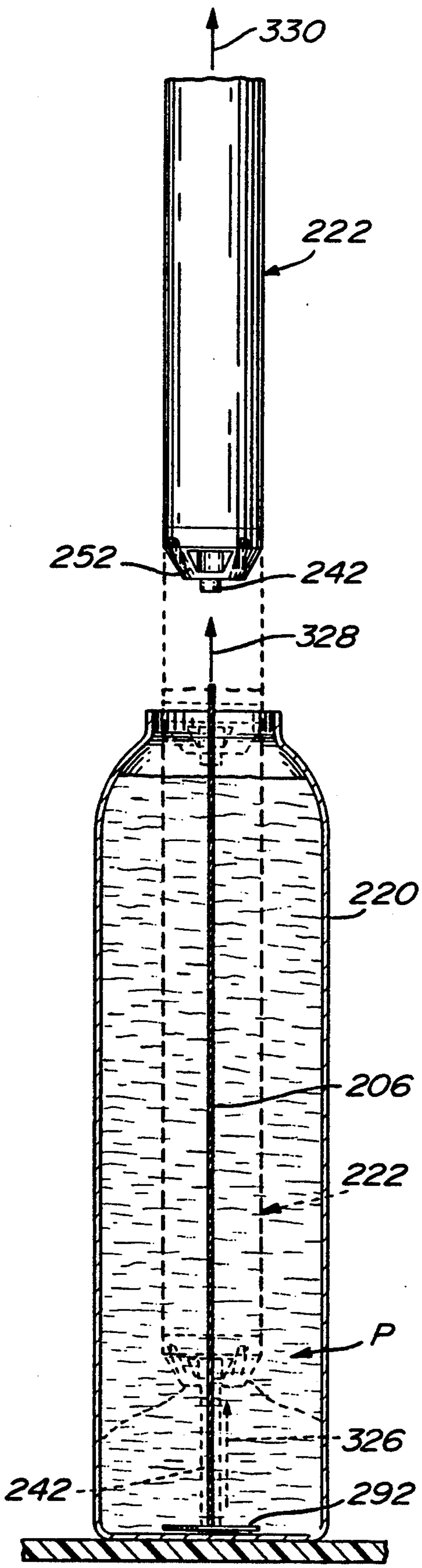

But, just before the raising of the filling head 222, the wick holder 242 is retracted to its original position inside the filling head 222, as indicated by arrow 326 in FIG. 12. Then, the filling head 222 is raised in the direction of arrow 328 while supplying pasty paraffin P in the bottle 220. When the required amount of pasty paraffin P has been introduced in the bottle 220 (see FIG. 12), the valve 246 is closed and the filling head 222 is removed from the bottle 220 along arrow 330 until it reaches its uppermost position shown in FIG. 9, at which point the cycle starts over with the ferrule 208 being engaged to the wick 206 by the ferrule driving device 256. Also, the conveyor 210 is operated to position a new row of empty bottles under the transversely aligned filling heads 222.

Once a case of bottles 220 has been provided with a ferrule and wick assembly and filled with pasty paraffin P, it is conveyed by way of the conveyor 210 to the heating apparatus 212, as seen in FIG. *2a* which identifies such a case with the reference numeral 214. The heating apparatus 212 comprises a series of infrared lamps 332 which heat the top portion of the pasty paraffin P inside of the bottles 220 in order to, by melting, render level the upper surface of the paraffin and to remove paraffin deposits which may lie on the glass surfaces and edges of the bottles 220. The conveyor 210 also extends past the heating apparatus 212 to provide a cooling conveyor for the finished candles.

It is noted that infrared lamps (not shown) may also be used in addition or in replacement of the heating element 254 of the filling head 222 to prevent pasty paraffin from solidifying therein and hamper the subsequent operation thereof.

Figure 13:
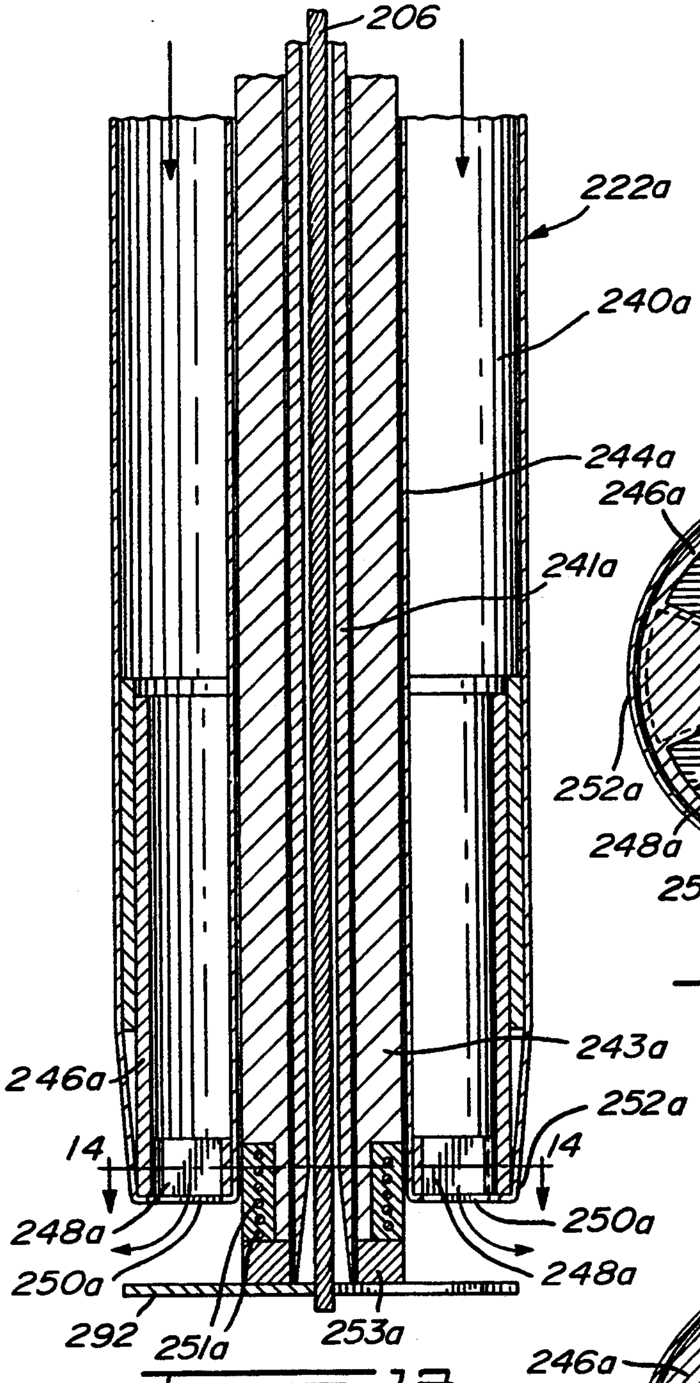
FIG. 13 is a cross-sectional elevation of an alternate container filling head.
Figure 15:
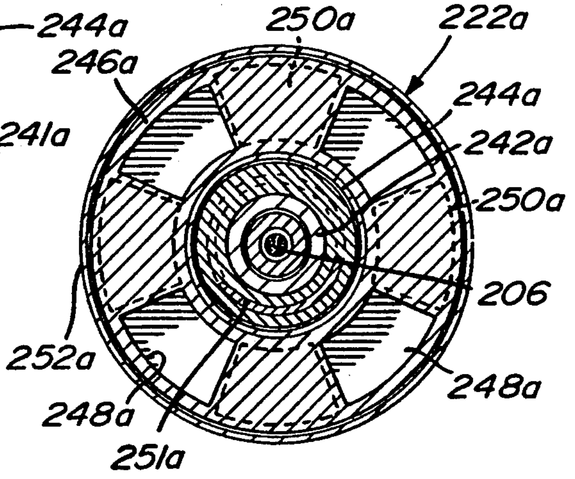
FIG. 15 is a cross-sectional view similar to FIG. 14 of the alternate filling head but showing the valve in a closed position thereof.
Figure 14:
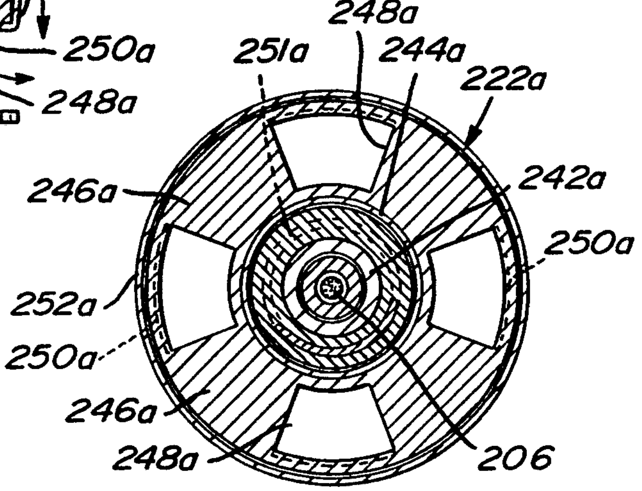
FIG. 14 is a cross-sectional view taken along lines 14—14 of FIG. 13 showing the valve of the alternate filling head in an open position thereof.

FIGS. 13 to 15 illustrate an alternate filling head **222*a* which defines an annular paraffin receiving cavity 240*a* disposed around a tubular ferrule holder 243*a*. A tubular wick guide 241*a* is disposed inside the ferrule holder 243*a*. The ferrule holder 243*a* is slidable in a sleeve 244*a* and includes at its lower end an electrical heating element 254*a* and, if desired, a magnet 253*a* for holding the stamped ferrule 292. The cavity 240*a* is adapted with a valve 246*a* at a lower end 252*a* of the filling head 222*a*. The valve 246*a* defines openings 248*a*, whereas the lower end 252*a* defines openings 250*a*, with both sets of openings being either aligned or "out of phase" depending on whether the valve 246*a* is open or closed, respectively. The valve 246*a* is of the type that rotates in a horizontal plane in increments of 90°, as it was the case for previously described valve 246 of FIGS. 3 to 5**.

We claim:

1. A process for producing pasty paraffin comprising the steps of:
   a) supplying liquid paraffin to a solidification means comprising agitator means and cooling means for the liquid paraffin, said agitator means being driven by motor means;
   b) cooling the liquid paraffin in said solidification means by way of said cooling means while the liquid paraffin is mixed by said agitator means for producing pasty paraffin, a temperature of said cooling means being controlled by monitoring the power required from said motor means for driving said agitator means in such a way so as to obtain pasty paraffin of proper viscosity;
   c) extracting from said solidification means the pasty paraffin having proper viscosity for subsequent use in the production of selected articles.

* * * * *